(12) United States Patent
Padmanabhan et al.

(10) Patent No.: US 6,567,902 B1
(45) Date of Patent: May 20, 2003

(54) SYSTEMS AND METHODS FOR PACKING DATA INTO A DESTINATION REGISTER

(75) Inventors: Ramesh Padmanabhan, Los Altos, CA (US); Dev Chen, Cupertino, CA (US)

(73) Assignee: Juniper Networks. Inc., Sunnyvale, CA (US)

( * ) Notice: Subject to any disclaimer, the term of this patent is extended or adjusted under 35 U.S.C. 154(b) by 191 days.

(21) Appl. No.: 09/637,709

(22) Filed: Aug. 15, 2000

(51) Int. Cl.$^7$ .............................................. G06F 12/06
(52) U.S. Cl. ...................................... 711/165; 711/156
(58) Field of Search ................................ 711/165, 154, 711/156; 710/3, 4, 22, 30, 33, 55; 370/382

(56) References Cited

U.S. PATENT DOCUMENTS

| | | | | |
|---|---|---|---|---|
| 5,317,719 A | * | 5/1994 | Rozmovits | 703/24 |
| 5,555,405 A | * | 9/1996 | Griesmer et al. | 707/205 |
| 5,594,927 A | * | 1/1997 | Lee et al. | 710/22 |
| 5,638,367 A | * | 6/1997 | Gaytan et al. | 370/471 |
| 5,765,022 A | * | 6/1998 | Kaiser et al. | 710/22 |
| 6,026,450 A | * | 2/2000 | Kaganoi et al. | 370/382 |
| 6,047,001 A | * | 4/2000 | Kuo et al. | 370/428 |
| 6,182,266 B1 | * | 1/2001 | Clutter et al. | 365/218 |
| 6,307,860 B1 | * | 10/2001 | Joffe et al. | 370/412 |
| 6,466,581 B1 | * | 10/2002 | Yee et al. | 711/153 |

FOREIGN PATENT DOCUMENTS

| | | | | |
|---|---|---|---|---|
| EP | 651580 A2 | * | 5/1995 | H04N/7/26 |
| EP | 827083 A2 | * | 3/1998 | G06F/13/16 |

* cited by examiner

*Primary Examiner*—Matthew Kim
*Assistant Examiner*—Pierre-Michel Bataille
(74) *Attorney, Agent, or Firm*—Harrity & Snyder, L.L.P.

(57) ABSTRACT

A data packing system includes a source memory, a destination memory, and a data packer. The source memory stores data in source storage locations. The data includes valid data and invalid data. The destination memory stores at least some of the data from the source memory in destination storage locations. The destination memory stores the valid data in contiguous ones of the destination storage locations. The data packer transmits the valid data from the source storage locations to the contiguous destination storage locations.

27 Claims, 8 Drawing Sheets

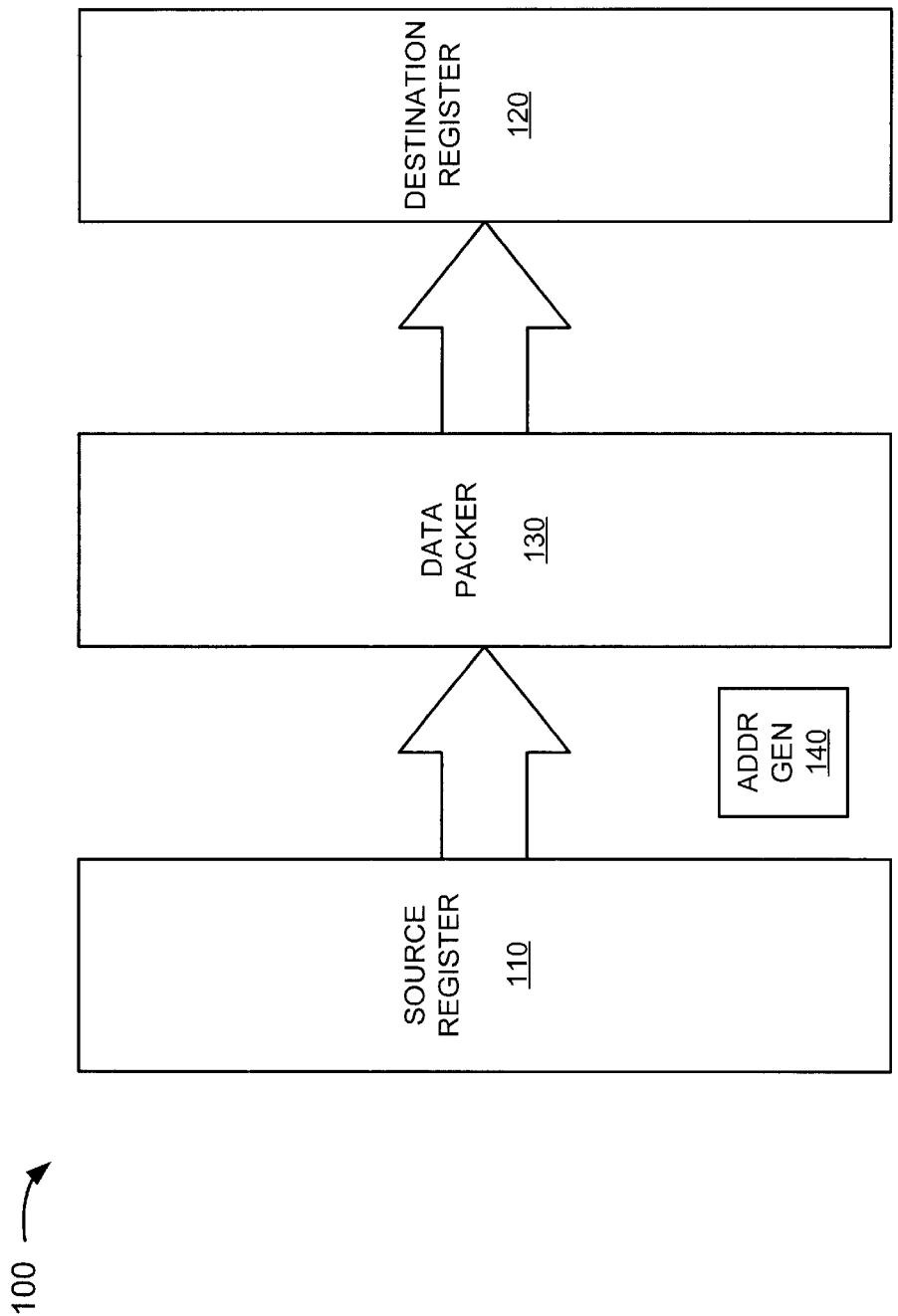

| SOURCE DATA BYTE_0 | VB INDICATOR | VB ADDRESS |
| SOURCE DATA BYTE_1 | VB INDICATOR | VB ADDRESS |
| SOURCE DATA BYTE_2 | VB INDICATOR | VB ADDRESS |
| SOURCE DATA BYTE_3 | VB INDICATOR | VB ADDRESS |
| SOURCE DATA BYTE_4 | VB INDICATOR | VB ADDRESS |
| SOURCE DATA BYTE_5 | VB INDICATOR | VB ADDRESS |
| SOURCE DATA BYTE_6 | VB INDICATOR | VB ADDRESS |
| SOURCE DATA BYTE_7 | VB INDICATOR | VB ADDRESS |
| SOURCE DATA BYTE_8 | VB INDICATOR | VB ADDRESS |
| SOURCE DATA BYTE_9 | VB INDICATOR | VB ADDRESS |
| SOURCE DATA BYTE_10 | VB INDICATOR | VB ADDRESS |
| SOURCE DATA BYTE_11 | VB INDICATOR | VB ADDRESS |
| SOURCE DATA BYTE_12 | VB INDICATOR | VB ADDRESS |
| SOURCE DATA BYTE_13 | VB INDICATOR | VB ADDRESS |
| SOURCE DATA BYTE_14 | VB INDICATOR | VB ADDRESS |
| SOURCE DATA BYTE_15 | VB INDICATOR | VB ADDRESS |

FIG. 2

SYSTEMS AND METHODS FOR PACKING DATA INTO A DESTINATION REGISTER

BACKGROUND OF THE INVENTION

A. Field of the Invention

The present invention relates generally to communication systems and, more particularly, to systems and methods for packing data from a source register into a destination register.

B. Description of Related Art

Some conventional systems include source and destination registers. During operation, data from a source register that may contain some invalid data bytes may be transferred to a destination register that stores valid data bytes in contiguous locations. The resulting problem of transferring the valid bytes of data from the source register to contiguous locations in the destination register may be referred to as "packing." The problem becomes particularly troublesome when the invalid data bytes are randomly located amidst valid data bytes in the source register.

As a result, a need exists for a mechanism that packs non-contiguous valid bytes of data from a source register to contiguous locations in a destination register.

SUMMARY OF THE INVENTION

Systems and methods consistent with the present invention address this need by providing a packing mechanism that permits valid bytes of data from non-contiguous locations in a source register to be transferred to contiguous locations in a destination register.

In accordance with the purpose of the invention as embodied and broadly described herein, a data packing system includes a source memory, a destination memory, and a data packer. The source memory stores data in source storage locations. The data includes valid data and invalid data. The destination memory stores at least some of the data from the source memory in destination storage locations. The destination memory stores the valid data in contiguous ones of the destination storage locations. The data packer transmits the valid data from the source storage locations to the contiguous destination storage locations.

In another implementation consistent with the present invention, a method packs data from source storage locations of a source memory to destination storage locations of a destination memory. The data includes valid data and invalid data. The method includes storing the data in the source storage locations, at least some of the invalid data being interspersed among the valid data in the source storage locations; generating addresses for each of the valid data; transferring the valid data from the source storage locations to contiguous ones of the destination storage locations using the generated addresses and the invalid data to other ones of the destination storage locations; and storing the valid data and invalid data in the destination storage locations of the destination memory.

In yet another implementation consistent with the present invention, a data packer packs data from source storage locations in a source register into destination storage locations in a destination register. The data includes valid and invalid data. The data packer includes at least one comparator and at least one multiplexer. The comparator generates at least one selection signal. The multiplexer receives the valid and invalid data from the source storage locations as inputs and transmits the valid data to contiguous ones of the destination storage locations from ones of the source storage locations in response to the selection signal.

In a further implementation consistent with the present invention, a method packs data from source storage locations in a source register into destination storage locations in a destination register. The data includes valid and invalid data. The method includes generating a plurality of selection signals; transferring the valid data from ones of the source storage locations to contiguous ones of the destination storage locations in response to the selection signals; and sending the invalid data from other ones of the source storage locations to other ones of the destination storage locations in response to the selection signals.

In another implementation consistent with the present invention, a computer-readable memory device contains a data structure, including data byte areas, valid byte indicator areas, and valid byte address areas. The data byte areas store a valid data byte or an invalid data byte. The valid byte indicator areas store indications of whether a corresponding one of the data byte areas stores a valid data byte or an invalid data byte. The valid byte address areas store addresses when a corresponding one of the data byte areas stores a valid data byte.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 is a diagram of an exemplary system in which systems and methods consistent with the present invention may be implemented;

FIG. 2 is a detailed diagram of the source register of FIG. 1 according to an implementation consistent with the present invention;

DETAILED DESCRIPTION

Figure 3:
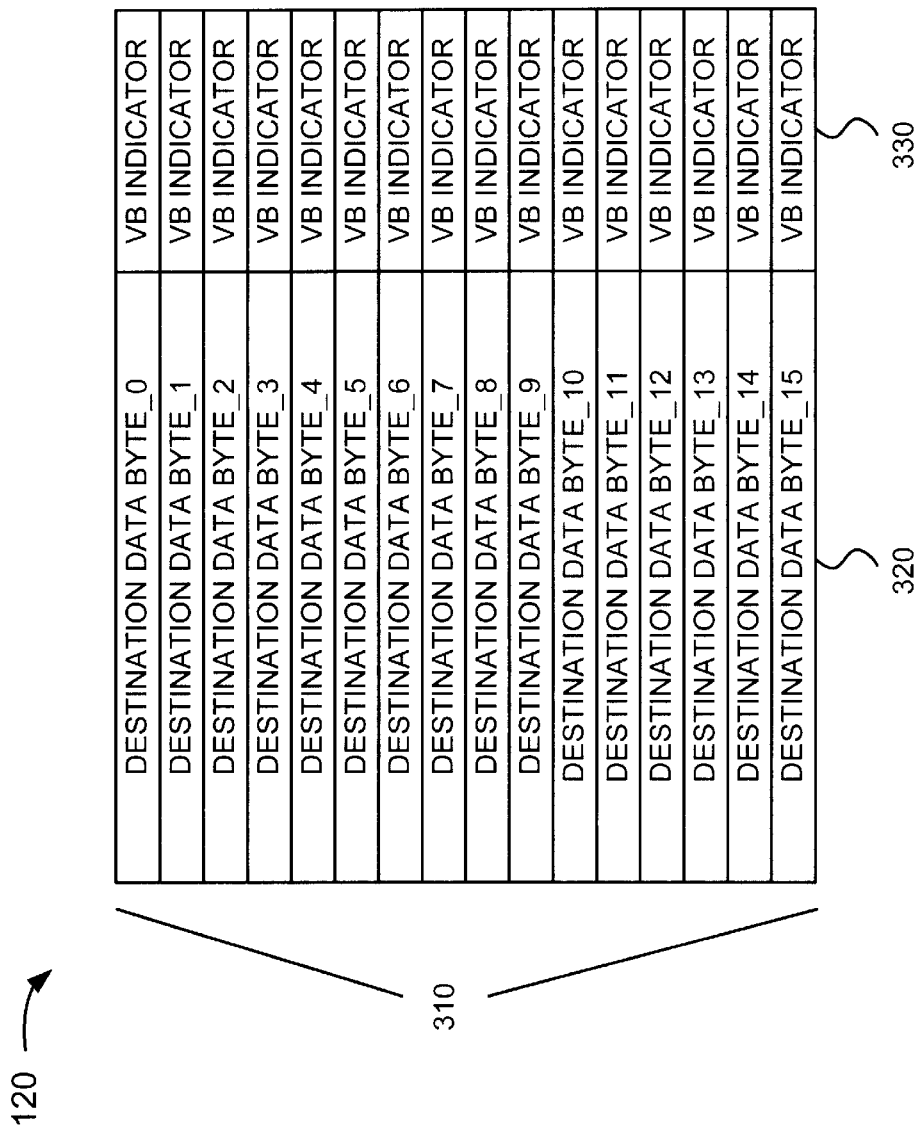
FIG. 3 is a detailed diagram of the destination register of FIG. 1 according to an implementation consistent with the present invention.

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a packing mechanism that packs valid data that is not necessarily stored in contiguous locations in a source register into contiguous locations in a destination register, possibly in a single clock cycle.

Exemplary System

FIG. 1 is an exemplary system 100 consistent with the present invention. The system 100 includes a source register 110, a destination register 120, a data packer 130, and an address generator 140. The source register 110 receives data from a source and transmits the data to the destination register 120 via the data packer 130. The source register 110 may include a conventional register that stores a number of bytes of data.

FIG. 2 is a detailed diagram of the source register 110 according to an implementation consistent with the present invention. In this implementation, the source register 110 includes sixteen storage locations 210 that store sixteen bytes of data. In other implementations, the source register 110 may contain a different number of storage locations and store a different number of bytes.

Each of the storage locations 210 may include a data buffer 220, a valid byte indicator 230, and a valid byte address 240. The data buffer 220 may store a single byte of data. The valid byte indicator 230 may store one or more bits that indicate whether the data stored in the data buffer 220 is valid. In an implementation consistent with the present invention, the valid byte indicator 230 stores a single bit that has a first value to indicate "valid" and a second value to indicate "invalid."

The valid byte address 240 may store an address used in the data packing process (described below). Only valid data bytes may include a valid byte address 240. The valid byte address 240 may contain a null or empty value for invalid data bytes. The address generator 140 (FIG. 1) generates the valid byte addresses 240.

Returning to FIG. 1, the address generator 140 may include a software and/or hardware address generator located within the source register 110, the data packer 130, or separate therefrom. The address generator 140 assigns an address to each of the valid data bytes in the source register 110. The address for any valid byte is an increment of one greater than the address for the preceding valid byte in the source register 110. For example, assume that the source register 110 contains four bytes of data (i.e., byte 0–byte 3), bytes 0, 1, and 3 are valid, and byte 2 is invalid. In this case, byte 0 may be assigned an address of 0 and byte 1 an address of 1 (i.e., one more than the address for byte 0). Since byte 2 is invalid, its address is nullified. Byte 3 is the next valid byte and its address is one more than the address of the previous valid byte (i.e., byte 1), or 2.

The destination register 120 may include a conventional register that receives data bytes from the source register 110 and may send the data bytes onto their intended destination. FIG. 3 is a detailed diagram of the destination register 120 according to an implementation consistent with the present invention. Like the source register 110, the destination register 120 may include sixteen storage locations 310 that store sixteen bytes of data. In other implementations, the destination register 120 stores a different number of bytes, possibly different from the number of bytes stored by the source register 110.

Each of the storage locations 310 may include a data buffer 320 and a valid byte indicator 330. The data buffer 320 may store a single byte of data. The valid byte indicator 330 may store one or more bits that indicate whether the data stored in the data buffer 320 is valid. In an implementation consistent with the present invention, the valid byte indicator 330 stores a single bit that has a first value to indicate "valid" and a second value to indicate "invalid."

Figure 4:
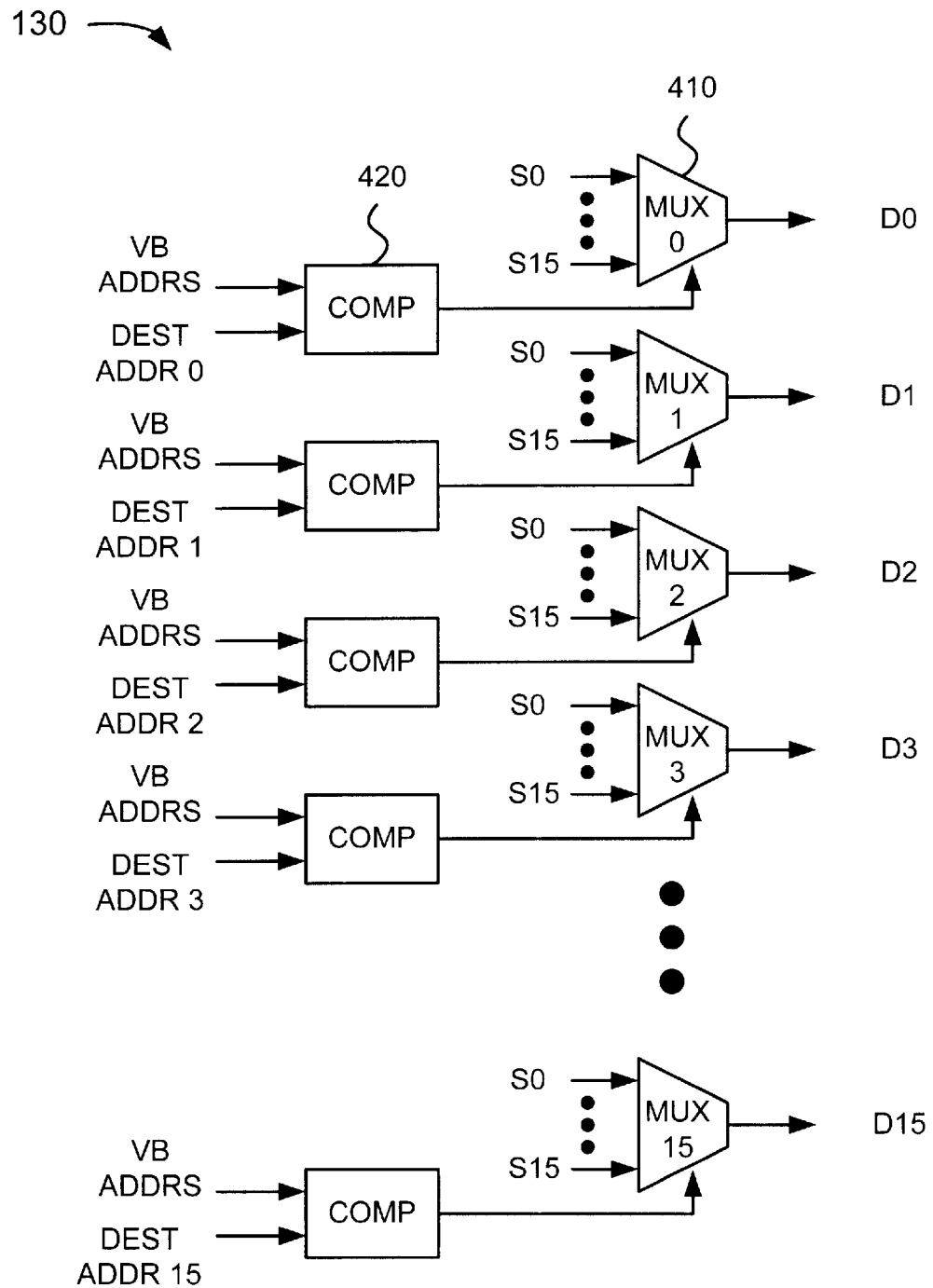
FIG. 4 is a detailed diagram of the data packer of FIG. 1 according to an implementation consistent with the present invention.

Returning to FIG. 1, the data packer 130 facilitates the transmission of data bytes from the source register 110 to the destination register 120. FIG. 4 is a detailed diagram of the data packer 130 according to an implementation consistent with the present invention. The data packer 130 may include a multiplexer 410 and a comparator 420 corresponding to each of the storage locations 310 (FIG. 3) in the destination register 120.

The multiplexer 410 may include a conventional multiplexing device that receives multiple inputs and outputs one of them in response to a selection signal. In an implementation consistent with the present invention, the multiplexer 410 includes a 16:1 multiplexer that receives the data bytes from each of the data buffers 220 (FIG. 2), and possibly the corresponding valid byte indicators 230, from the source register 110 and transmits one of the data bytes (and valid byte indicators 230) to the corresponding storage location 310 in the destination register 120. The multiplexer 410 determines which of the data bytes (and valid byte indicators 230) to send to the corresponding storage location 310 based on a value of a selection signal from the comparator 420.

The comparator 420 may include a conventional device that compares two or more values and generates a result based on the comparison. In an implementation consistent with the present invention, the comparator 420 compares each of the valid byte addresses 240 from the source register 110 to the address of the corresponding storage location 310 in the destination register 120 and generates a result based on the comparison. The comparator 420 looks for a match between one of the valid byte addresses 240 and the address of the storage location 310. When the comparator 420 discovers a match, it generates a selection signal to instruct the multiplexer 410 to select the data buffer 220 (and possibly the valid byte indicator 230) corresponding to the valid byte address 240.

When the comparator 420 finds no match such as in the case of an invalid byte of data, the comparator 420 may generate a selection signal for selecting one of the invalid bytes of data from the source register 110. The particular selection process used by the comparator 420 to select among the one or more data buffers 220 containing invalid data bytes may vary.

Exemplary Processing

Figure 5:
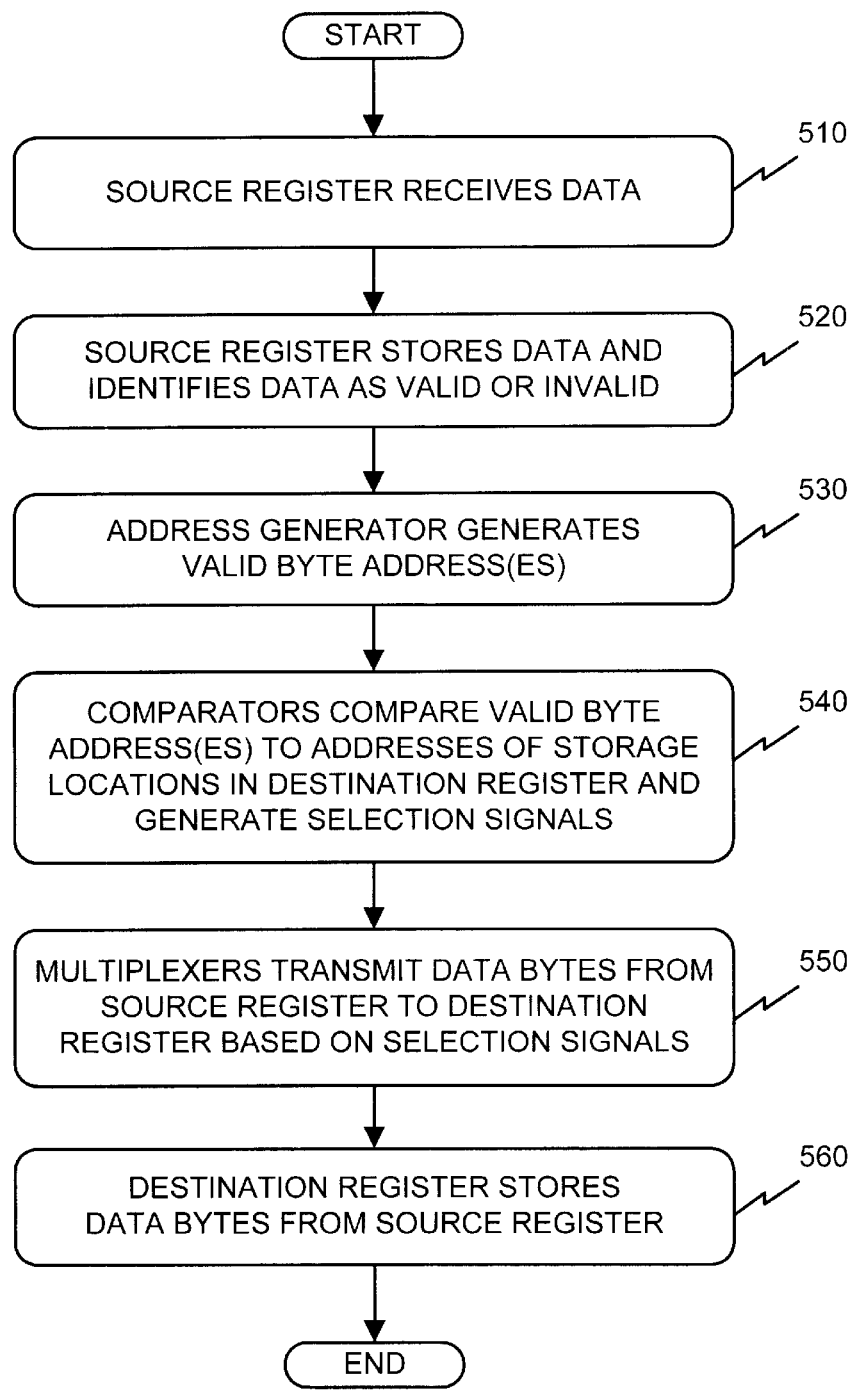
FIG. 5 is an exemplary flowchart of processing for packing data from the source register into the destination register according to an implementation consistent with the present invention.

FIG. 5 is an exemplary flowchart of processing for packing data from the source register 110 into the destination register 120 according to an implementation consistent with the present invention. Processing begins when the source register 110 receives data from a source [step 510]. The source register 110 stores the data as data bytes in the data buffers 220 and identifies each of the data bytes as valid or invalid [step 520]. The source register 110 may use conventional techniques to determine whether a particular data byte is valid or invalid. The source register 110 stores an indication of the validity or invalidity of a data byte in the valid byte indicator 230.

The address generator 140 generates valid byte addresses 240 for each of the data buffers 220 that contain valid data bytes [step 530]. As described above, the address for any valid byte is an increment of one greater than the address for the preceding valid byte in the source register 110. The valid byte address 240 for the first valid byte may be set to "0," or any other value.

The comparators 420 (FIG. 4) compare the valid byte addresses 240 to the addresses of the corresponding storage locations 310 in the destination register 120 to generate selection signals for the multiplexers 410 [step 540]. Each of the comparators 420 looks for a match between one of the valid byte addresses 240 and the address of the corresponding storage location 310. When a match is found, the comparator 420 generates the appropriate selection signal to instruct the associated multiplexer 410 to transmit the valid data byte from the source register 110 to the storage location 310 in the destination register 120. When no match is found, however, the comparator 420 may generate a selection signal to instruct the associated multiplexer 410 to transmit one of the invalid data bytes from the source register 110 to the storage location 310 in the destination register 120.

Each of the multiplexers 410 receives all of the data bytes from the source register 110 as inputs and transmits one of them to a corresponding storage location 310 in the destination register 120 based on the selection signal received from the associated comparator 420 [step 550]. The destination register 120 receives the data bytes (both valid and invalid) from the source register 110 and stores them as received from the multiplexers 410 [step 560].

EXAMPLE

Figure 6A:
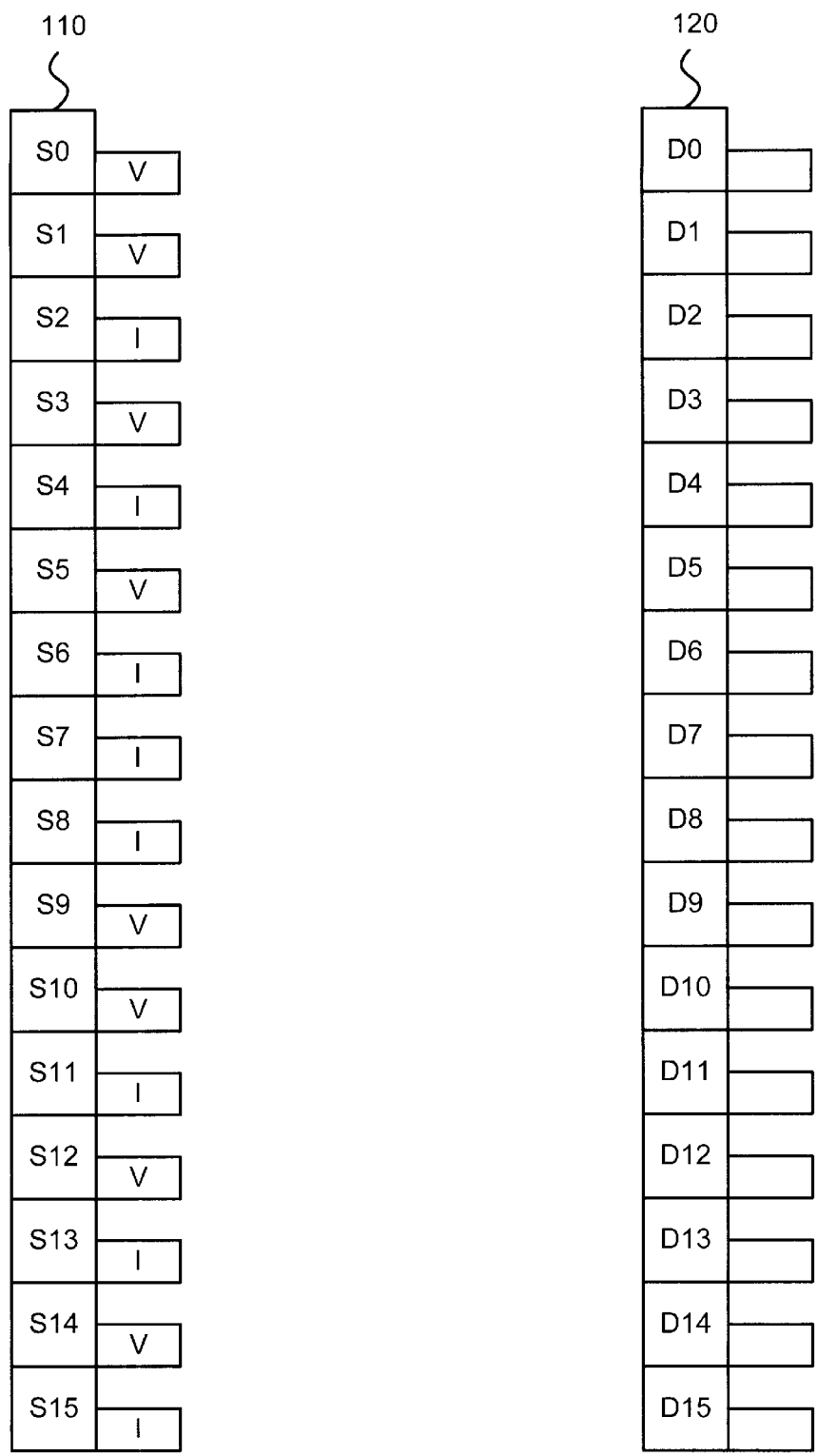
FIGS. 6A–6C are diagrams of exemplary operations performed by the system of FIG. 1 according to an implementation consistent with the present invention.
Figure 6B:
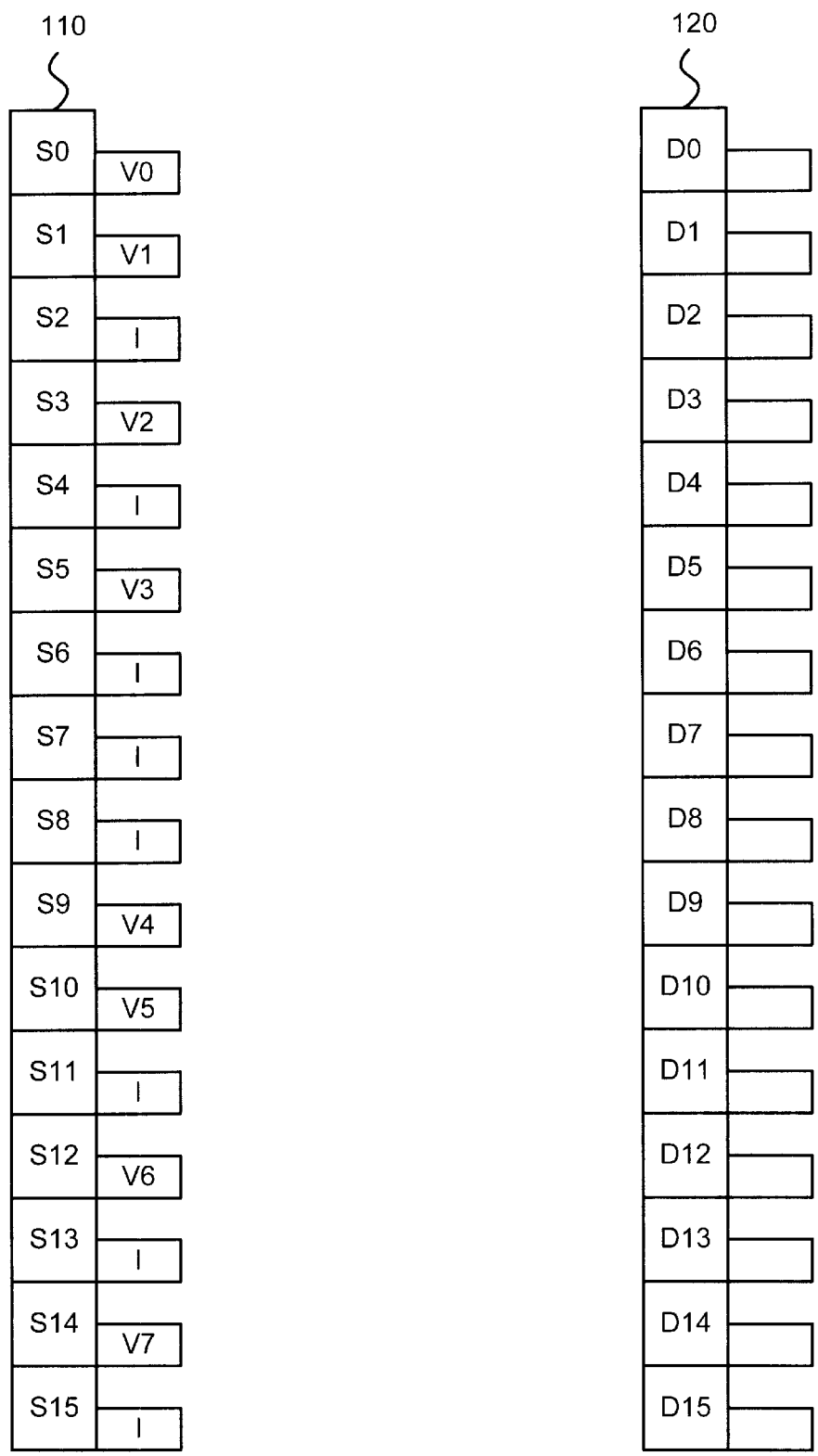
Figure 6C:
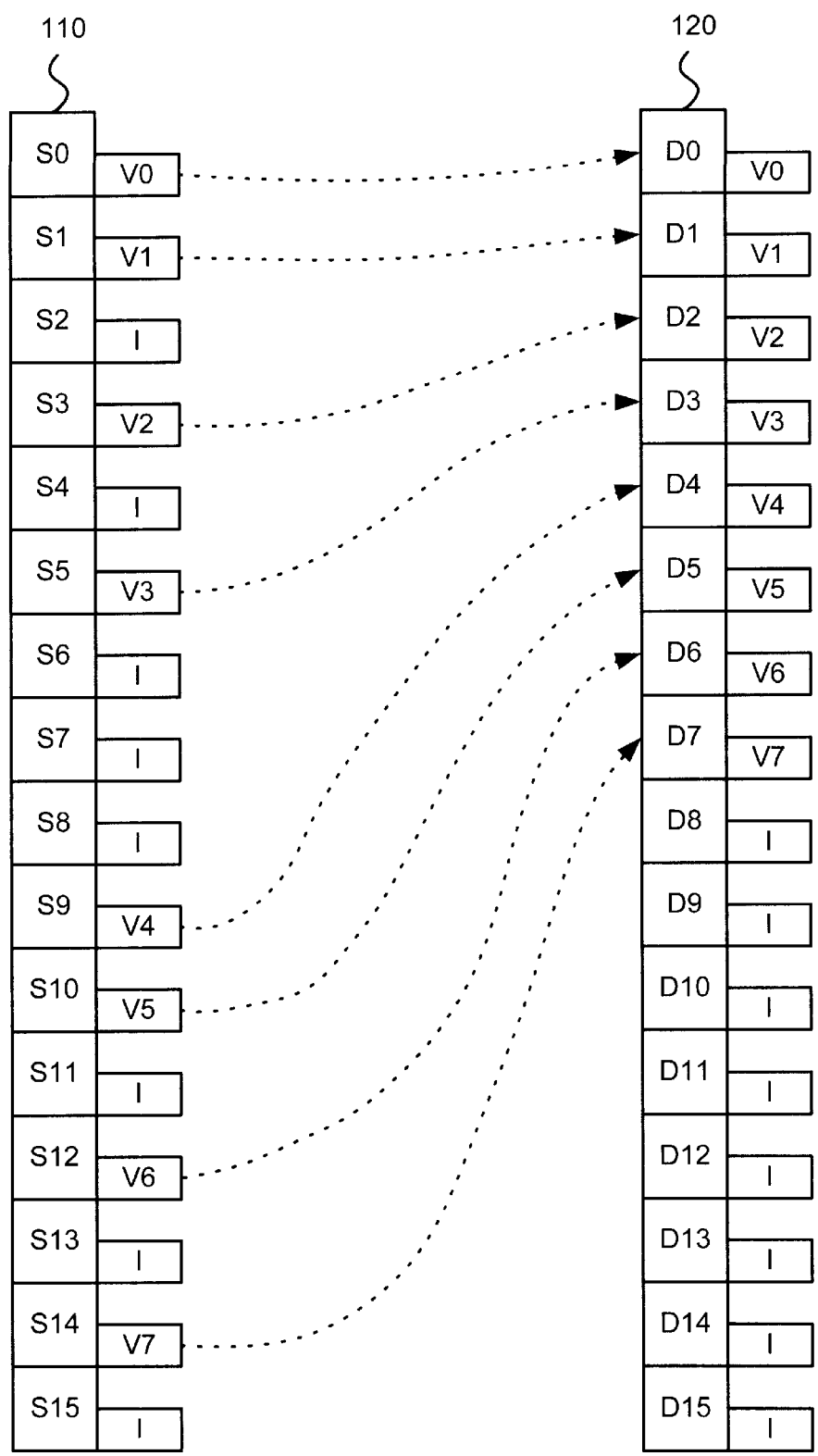

FIGS. 6A–6C are diagrams of exemplary operations performed by the system 100 according to an implementation consistent with the present invention. In FIG. 6A, the source register 110 receives sixteen bytes of data. Storage locations S0, S1, S3, S5, S9, S10, S12, and S14 store valid data and storage locations S2, S4, S6–S8, S11, S13, and S15 store invalid data.

In FIG. 6B, the address generator 140 generates valid byte addresses for each of the valid bytes. The address generator 140 starts with storage location S0 and assigns it valid byte address 0. Storage location S1 stores the next valid byte. Therefore, the address generator 140 increments the valid byte address of the previous storage location that contains a valid byte. In this case, the address generator 140 assigns storage location S1 a valid byte address of 1. Storage location S2 stores an invalid byte and, therefore, is not assigned a valid byte address. Storage location S3 stores the next valid byte. Therefore, the address generator 140 assigns it a valid byte address of 2. The address generator 140 continues this processing to assign valid byte addresses to the storage locations as shown in FIG. 6B.

In FIG. 6C, the data bytes are transmitted from the source register 110 to the destination register 120 via the data packer 130 (not shown in FIG. 6C). The data packer 130 determines which storage locations in the destination register 120 receive which of the valid bytes from the source register 110. Based on the processing described above, storage location D0 in the destination register 120 receives the valid byte from the storage location S0 in the source register 110. Similarly, the storage locations D1–D7 receive the valid bytes from the storage locations S1, S3, S5, S9, S10, S12, and S14, respectively.

CONCLUSION

Systems and methods consistent with the present invention pack valid data from non-contiguous locations in a source register into contiguous locations in a destination register. As a result of the above systems and methods, data packing from the source register to the destination register may take place in a single clock cycle.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the source register 110 has A been described as storing a valid byte address 240 for each valid byte of data. In another implementation consistent with the present invention, the address generator 140, not the source register, 110, stores this information. In this case, the address generator 140 may include a memory device for storing the valid byte addresses.

In addition, the data packer 130 has been described as including a multiplexer 410 and comparator 420 for each storage location of the destination register 120. In another implementation consistent with the present invention, at least some of the operations performed by the data packer 130 are implemented in software. In other implementations, the data packer 130 includes different hardware elements than those shown in FIG. 4 or the same hardware elements configured differently.

Also, while the data has been described in terms of bytes, this need not be the case. Other sizes of data may be, used in other implementations consistent with the present invention.

The scope of the invention is defined by the claims and their equivalents.

What is claimed is:

1. A data packing system, comprising:
   a source memory configured to store data in a plurality of source storage locations, at least one of the source storage locations storing data representing valid data and at least one other one of the source storage locations storing data representing invalid data;
   a destination memory configured to store at least some of the data from the source memory in a plurality of destination storage locations, the destination memory storing the valid data in contiguous ones of the destination storage locations; and
   a data packer configured to transmit the valid data from the source storage locations to the contiguous ones of the destination storage locations, the data packer including:
      at least one comparator configured to generate at least one selection signal, and
      at least one multiplexer configured to receive the data from the source storage locations as inputs and transmit the data from ones of the source storage locations to ones of the destination storage locations in response to the at least one selection signal.

2. The system of claim 1, wherein each of the source storage locations includes:
   a data section configured to store at least one of the valid data and the invalid data,
   a valid indicator section configured to store an indication of whether the data section stores valid data or invalid data, and
   a valid address section configured to store an address when the data section stores valid data.

3. The system of claim 2, further comprising:
   an address generator configured to generate the address stored by the valid address section.

4. The system of claim 3, wherein the address generator is configured to determine the address based on an address stored in the valid address section of another one of the source storage locations.

5. The system of claim 1, further comprising:
   an address generator configured to generate an address for each of the valid data stored in the source memory.

6. The system of claim 5, wherein the at least one comparator is configured to compare the generated addresses with addresses corresponding to the destination storage locations and generate the at least one selection signal based on the comparisons.

7. The system of claim 6, wherein each of the comparators is configured to identify a match between one of the generated addresses and the address for one of the destination storage locations and generate a selection signal that instructs the at least one multiplexer to transmit a corresponding one of the valid data from the source memory to the one destination storage location.

8. The system of claim 5, wherein the address generator includes:
a valid address memory configured to store the:generated addresses.

9. The system of claim 5, wherein the address generator is configured to determine the generated addresses based on addresses generated for other ones of the valid data.

10. A data packing system, comprising:
means for storing a plurality of bytes of data in a plurality of source storage locations, at least one of the bytes representing a valid byte and at least one other one of the bytes representing an invalid byte;
means for generating at least one selection signal;
means for receiving the bytes of data from the source storage locations;
means for transferring the valid bytes of the bytes of data to contiguous ones of a plurality of destination storage locations based on the at least one selection signal; and
means for storing the valid bytes from the source storage locations in the contiguous ones of the destination storage locations.

11. A data packing system, comprising:
a source memory configured to store data in a plurality of source storage locations, at least one of the source storage locations storing data representing valid data and at least one other one of the source storage locations storing data representing invalid data;
a destination memory configured to store at least some of the data from the source memory in a plurality of destination storage locations, the destination memory storing the valid data in contiguous ones of the destination storage locations; and
a data packer configured to transmit the valid data from the source storage locations to the contiguous ones of the destination storage locations, the data packer including:
a plurality of comparators configured to generate a plurality of selection signals, and
a plurality of multiplexers corresponding to the destination storage locations, each of the multiplexers being configured to receive the data from the source storage locations as inputs and transmit the data from one of the source storage locations to the corresponding destination storage location in response to the selection signal from one of the comparators.

12. A data packer that packs data from a plurality of source storage locations in a source register into a plurality of destination storage locations in a destination register, the data including valid and invalid data, the data packer comprising:
at least one comparator configured to generate at least one selection signal; and
at least one multiplexer configured to receive the valid and invalid data from the source storage locations as inputs and transmit the valid data to contiguous ones of the destination storage locations from ones of the source storage locations in response to the at least one selection signal.

13. The data packer of claim 12, further comprising:
an address generator configured to generate addresses corresponding to the valid data.

14. The data packer of claim 13, wherein the at least one comparator includes:
a plurality of comparators, each of the comparators being configured to generate a selection signal based on the generated addresses.

15. The data packer of claim 14, wherein the at least one multiplexer includes:
a plurality of multiplexers corresponding to the destination storage locations, each of the multiplexers being configured to transmit the valid or invalid data from one of the source storage locations to the corresponding destination storage location in response to the selection signal from one of the comparators.

16. The data packer of claim 13, wherein the at least one comparator is configured to compare each of the generated addresses to addresses corresponding to the destination storage locations and generate the at least one selection signal based on the comparisons.

17. A method for packing data from source storage locations of a source memory to destination storage locations of a destination memory, the data including valid data and invalid data, the method comprising:
storing the data in the source storage locations, at least some of the invalid data being interspersed among the valid data in the source storage locations;
generating addresses for each of the valid data;
generating at least one selection signal based on the generated addresses;
transferring the valid data from the source storage locations to contiguous ones of the destination storage locations based on the at least one selection signal and the invalid data to other ones of the destination storage locations; and
storing the valid data and invalid data in the destination storage locations of the destination memory.

18. The method of claim 17, wherein the storing the data in the source storage locations includes:
storing the data in a data section of a source storage location,
storing an indication of whether the data in the data section is valid in a valid indicator section of the source storage location, and
storing one of the generated addresses in a valid address section of the source storage location when the data section stores valid data.

19. The method of claim 17, wherein the generating includes:
determining each of the generated addresses from another one of the generated addresses.

20. The method of claim 17, wherein the generating at least one selection signal includes:
comparing each of the generated addresses to addresses corresponding to the destination storage locations, and
generating the at least one selection signal based the comparing.

21. The method of claim 17, wherein the transferring the valid data includes:
receiving the valid data from one or more of the source storage locations as inputs to at least one multiplexer, and outputting one of the valid data to one of the destination storage locations based on the at least one selection signal.

22. The method of claim 21, wherein the transferring the valid data further includes:

using the at least one selection signal to control the at least one multiplexer.

23. A method for packing data from a plurality of source storage locations in a source register into a plurality of destination storage locations in a destination register, the data including valid and invalid data, the method comprising:

generating a plurality of selection signals;

transferring the valid data from ones of the source storage locations to contiguous ones of the destination storage locations in response to the selection signals; and sending the invalid data from other ones of the source storage locations to other ones of the destination storage locations in response to the selection signals.

24. The method of claim 23, further comprising:

generating addresses corresponding to the valid data.

25. The method of claim 24, wherein the generating a plurality of selection signals includes:

producing the selection signals based on the generated addresses.

26. The method of claim 25, wherein the producing includes:

comparing each of the generated addresses to addresses corresponding to the destination storage locations, and generating the selection signals based on the comparisons.

27. A method for packing data from source storage locations of a source memory to destination storage locations of a destination memory, the data including valid data and invalid data, the method comprising:

storing the data in the source storage locations, at least some of the invalid data being interspersed among the valid data in the source storage locations;

generating addresses for each of the valid data;

transferring the valid data from the source storage locations to contiguous ones of the destination storage locations using the generated addresses and the invalid data to other ones of the destination storage locations in a single clock cycle; and storing the valid data and invalid data in the destination storage locations of the destination memory.

* * * * *